(12) United States Patent
Tsui et al.

(10) Patent No.: US 11,750,781 B2
(45) Date of Patent: Sep. 5, 2023

(54) PROJECTION APPARATUS AND PROJECTION METHOD

(71) Applicant: Optoma Corporation, New Taipei (TW)

(72) Inventors: Yuan-Mao Tsui, New Taipei (TW); Yu-Cheng Lee, New Taipei (TW)

(73) Assignee: Optoma Corporation, New Taipei (TW)

( * ) Notice: Subject to any disclaimer, the term of this patent is extended or adjusted under 35 U.S.C. 154(b) by 62 days.

(21) Appl. No.: 17/381,157

(22) Filed: Jul. 20, 2021

(65) Prior Publication Data

US 2022/0038668 A1 Feb. 3, 2022

(30) Foreign Application Priority Data

Jul. 30, 2020 (CN) .......................... 202010748591.6

(51) Int. Cl.
| | |
|---|---|
| *H04N 9/31* | (2006.01) |
| *G03B 21/14* | (2006.01) |
| *G06T 7/80* | (2017.01) |
| *G06T 7/194* | (2017.01) |

(52) U.S. Cl.
CPC ........... *H04N 9/3185* (2013.01); *G06T 7/194* (2017.01); *G06T 7/80* (2017.01); *G03B 21/142* (2013.01); *G03B 21/145* (2013.01)

(58) Field of Classification Search
CPC .. H04N 9/3185; H04N 9/3179; G03B 21/147; G03B 21/14
See application file for complete search history.

(56) References Cited

U.S. PATENT DOCUMENTS 8,840,250 B1* 9/2014 Yao .......................... G01S 17/46
353/77

FOREIGN PATENT DOCUMENTS

| CN | 101518067 | 8/2009 |
|---|---|---|
| CN | 102200679 | 9/2011 |
| CN | 105202444 | 12/2015 |

* cited by examiner

*Primary Examiner* — Ryan D Howard
(74) *Attorney, Agent, or Firm* — JCIPRNET

(57) ABSTRACT

A projection apparatus and a projection method are provided. The projection apparatus includes a projection device, a capturing image device, and a processing device. The capturing image device is configured to obtain an environmental image. The processing device is coupled to the projection device and the capturing image device. The processing device is configured to analyze the environmental image to provide at least one effective projection region. The processing device selects one of the at least one effective projection regions as a target projection region. The projection device is configured to project a projection image to the target projection region.

34 Claims, 4 Drawing Sheets

PROJECTION APPARATUS AND PROJECTION METHOD

CROSS-REFERENCE TO RELATED APPLICATION

This application claims the priority benefit of China application serial no. 202010748591.6, filed on Jul. 30, 2020. The entirety of the above-mentioned patent application is hereby incorporated by reference herein and made a part of this specification.

BACKGROUND

Technical Field

The disclosure relates to a display apparatus, and particularly relates to a projection apparatus and a projection method.

Description of Related Art

Regarding general projection apparatus (such as a projector), when a user wants to use the projection apparatus to perform projection in any space without a projection screen (such as a living room or a room at home), the user must first visually inspect an effective projection region, and then move a position of the projection apparatus, and operate the projection apparatus to try to project. In this regard, due to a large uncertainty in a visual inspection result of the user, the user must constantly move the position of the projection apparatus to try to project for multiple times. Therefore, when the general projection apparatus is used for performing projection in any space without a projection screen, the general projection apparatus cannot perform an efficient projection operation and cannot provide a good user experience.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure were acknowledged by a person of ordinary skill in the art.

SUMMARY

The disclosure is directed to a projection apparatus and a projection method capable of providing an automatic projection function.

Other objects and advantages of the disclosure may be further illustrated by the technical features broadly embodied and described as follows.

In order to achieve one or a portion of or all of the objects or other objects, the disclosure provides a projection apparatus including a projection device, a capturing image device, and a processing device. The capturing image device is configured to obtain an environmental image. The processing device is coupled to the projection device and the capturing image device. The processing device is configured to analyze the environmental image to provide at least one effective projection region. The processing device selects one of the at least one effective projection regions as a target projection region. The projection device is configured to project a projection image to the target projection region.

In order to achieve one or a portion of or all of the objects or other objects, the disclosure provides a projection method including following steps. An environmental image is obtained by a capturing image device. The environmental image is analyzed by a processing device to provide at least one effective projection region. One of the at least one effective projection regions is selected as a target projection region by the processing device. A projection image is projected to the target projection region by a projection device.

Based on the above description, the projection apparatus and the projection method of the disclosure are adapted to automatically determine the effective projection regions in a projection environment for user selection or automatic selection, so as to realize an efficient projection operation and provide a good user experience.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
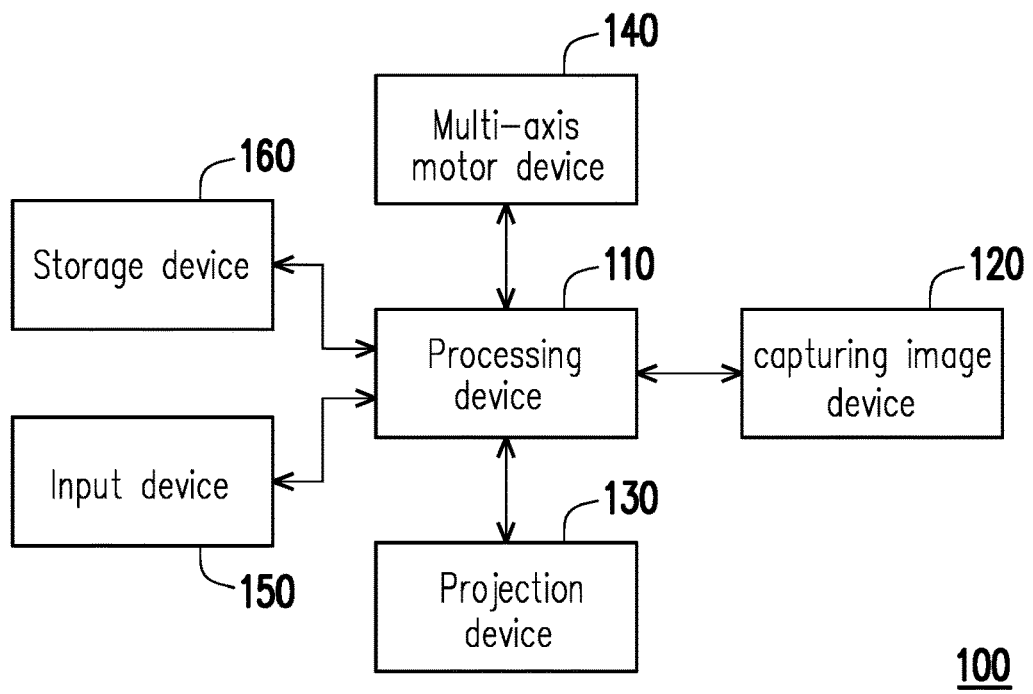
FIG. 1 is a schematic diagram of projection apparatus according to an embodiment of the disclosure.

It is to be understood that other embodiment may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "left," "right," "front,"

"back," etc., is used with reference to the orientation of the Figure(s) being described and are not intended to be limiting of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a schematic diagram of projection apparatus according to an embodiment of the disclosure. Referring to FIG. 1, a projection apparatus 100 includes a processing device 110, a capturing image device 120, a projection device 130, a multi-axis motor device 140, an input device 150, and a storage device 160. The projection apparatus 100 may also have a rechargeable battery, so as to achieve an effect that the projection apparatus 100 may adjust a projection image by itself after the projection apparatus 100 is carried and placed arbitrarily. The processing device 110 is coupled to the capturing image device 120, the projection device 130, the multi-axis motor device 140, the input device 150 and the storage device 160. In the embodiment, when the projection apparatus 100 is activated, the projection apparatus 100 may first obtain an environmental image of a space where the projection apparatus 100 is located through the capturing image device 120, and analyze the environmental image to determine whether there is an effective projection region in this space for the user to select to perform projection. In other embodiments, the processing device 110 may automatically select the effective projection region in the space to perform projection.

In the embodiment, the processing device 110 may be, for example, a central processing unit (CPU), or other programmable general-purpose or special-purpose microprocessor, a digital signal processor (DSP), or programmable controller, application specific integrated circuits (ASIC), a programmable logic device (PLD), other similar processing devices or a combination of these devices. The storage device 160 may be a memory, and the storage device 160 is used to store control programs, projection image data, and photographic image data related to the projector for the processing device 110 to access and execute.

In the embodiment, the capturing image device 120 may include a camera, such as a 360-degree camera, and is used to obtain an environmental image in the space, i.e., a panoramic image, such as a 360-degree panoramic image. The capturing image device 120 may be equipped with the multi-axis motor 140. In another embodiment, the capturing image device 120 may further include one or a plurality of image sensing units to perform three-dimensional sensing. For example, the capturing image device 120 may further include a depth sensor, where the depth sensor is, for example, a time-of-flight (ToF) sensor, and may be used to range objects in the environment, or the capturing image device 120 may also include a wide-angle camera, which is not limited by the disclosure.

In the embodiment, the projection device 130 may include a light source module, an optical engine module, a projection lens group, and an image transmission interface, and other related circuit elements. The light source module may include a light-emitting unit such as a discharge bulb, a light-emitting diode, or a laser light source. The optical engine module may include a reflective spatial light modulator or a transmissive spatial light modulator. The reflective spatial light modulator may be, for example, reflective liquid crystal on silicon (LCOS) or a digital micro-mirror device (DMD). The transmissive spatial light modulator may be, for example, a transparent liquid crystal panel. The projection lens group may include a plurality of lenses, and the plurality of lenses may form a projection optical path.

In the embodiment, the projection device 130 may be loaded on the multi-axis motor device 140 so that the projection device 130 may project toward an environmental background of any angle in the space where the projection apparatus 100 is located through rotation of the multi-axis motor device 140. In the embodiment, the multi-axis motor device 140 may include one or a plurality of motor modules, or is a nine-axis motor module. In the embodiment, the input device 150 may be a remote control device, and is used to correspondingly output a control signal to the processing device 110 according to an operation result of the user on the remote control device. In an embodiment, the input device 150 may also be a sound sensing device, and is used to sense a voice signal of the user, and correspondingly output a control signal to the processing device 110.

Figure 2:
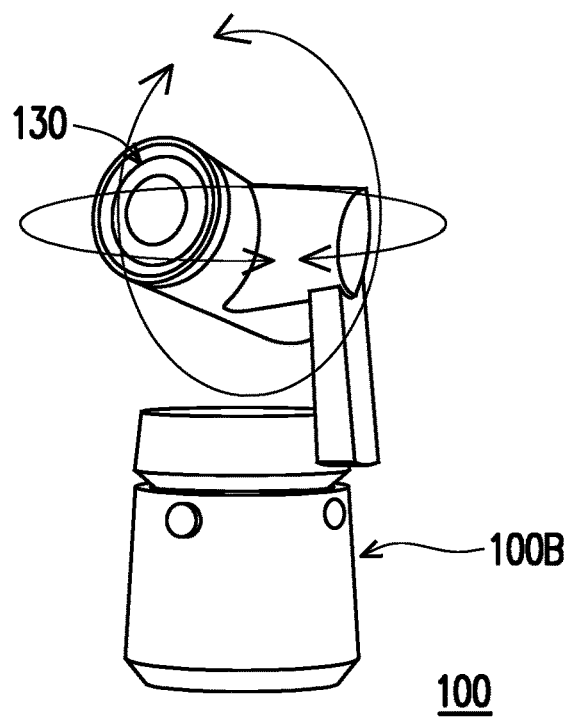
FIG. 2 is a schematic diagram of a projection device according to an embodiment of the disclosure.

FIG. 2 is a schematic diagram of a projection device according to an embodiment of the disclosure. Referring to FIG. 2, at least a part of the projection apparatus 100 may be an apparatus body 100B shown in FIG. 2. In the embodiment, the projection device 130 may be, for example, loaded on a multi-axis mechanism as shown in FIG. 2 to implement rotations in at least a horizontal direction and a vertical direction through the multi-axis mechanism, so that the projection device 130 may be automatically or manually rotated to project toward any background position in the environment. The multi-axis mechanism is driven by the multi-axis motor device 140. It should be noted that the capturing image device 120 may also be arranged at one place of the apparatus body 100B or on the aforementioned multi-axis mechanism, and the apparatus form of the projection apparatus 100 is not limited by the disclosure.

Figure 3:
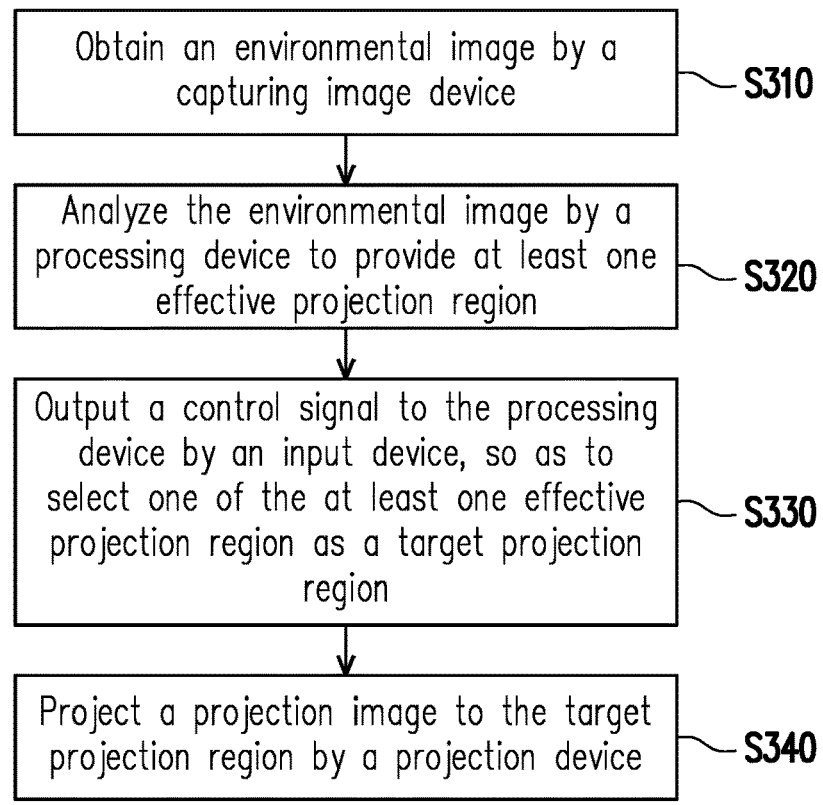
FIG. 3 is a flowchart illustrating a projection method according to an embodiment of the disclosure.

FIG. 3 is a flowchart illustrating a projection method according to an embodiment of the disclosure. Referring to FIG. 1 to FIG. 3, the projection method of FIG. 3 is adapted to the projection apparatus 100 of FIG. 1. In step S310, the projection apparatus 100 obtains an environmental image through the capturing image device 120. In step S320, the projection apparatus 100 analyzes the environmental image through the processing device 110 to provide at least one effective projection region. In step S310, the projection apparatus 100 outputs a control signal to the processing device 110 through the input device 150 to select one of the at least one effective projection regions as a target projection region.

It should be noted that in an embodiment, the input device of the projection apparatus 100 may further include a sound sensing device, where the sound sensing device may be used to sense a voice signal of the user to generate and output a control signal. In another embodiment, the input device of the projection apparatus 100 may further include a remote control device, and the remote control device may be used to correspondingly output the control signal according to an operation result of the user. In other words, the method for the user to select the target projection region in the embodiment may be implemented through voice control or remote control of the projection apparatus 100 through the remote control device.

Then, in step S340, the projection apparatus 100 projects the projection image to the target projection region through the projection device 130. Therefore, the projection method of the embodiment enables the processing device 110 of the projection apparatus 100 to automatically detect the environmental image to automatically determine whether there is an effective projection region in the environment. Moreover, the projection method of the embodiment enables the projection apparatus 100 to select an effective projection region as the target projection region automatically or according to user's operation to perform automatic projection on the target projection region.

Moreover, in an embodiment, the projection apparatus 100 may also include a wired or wireless communication interface. The communication interface is coupled to the processing device 110, and is used to connect an imaging IoT device to receive image data provided by the imaging IoT device, and the processing device 110 may project the corresponding projection image to the target projection region according to the image data. Moreover, regarding relevant technical details of the projection apparatus 100 of the embodiment, reference may be made to the descriptions of the aforementioned embodiments of FIG. 1 and FIG. 2 to obtain sufficient teachings, suggestions, and implementation instructions, and details thereof are not repeated.

Figure 4:
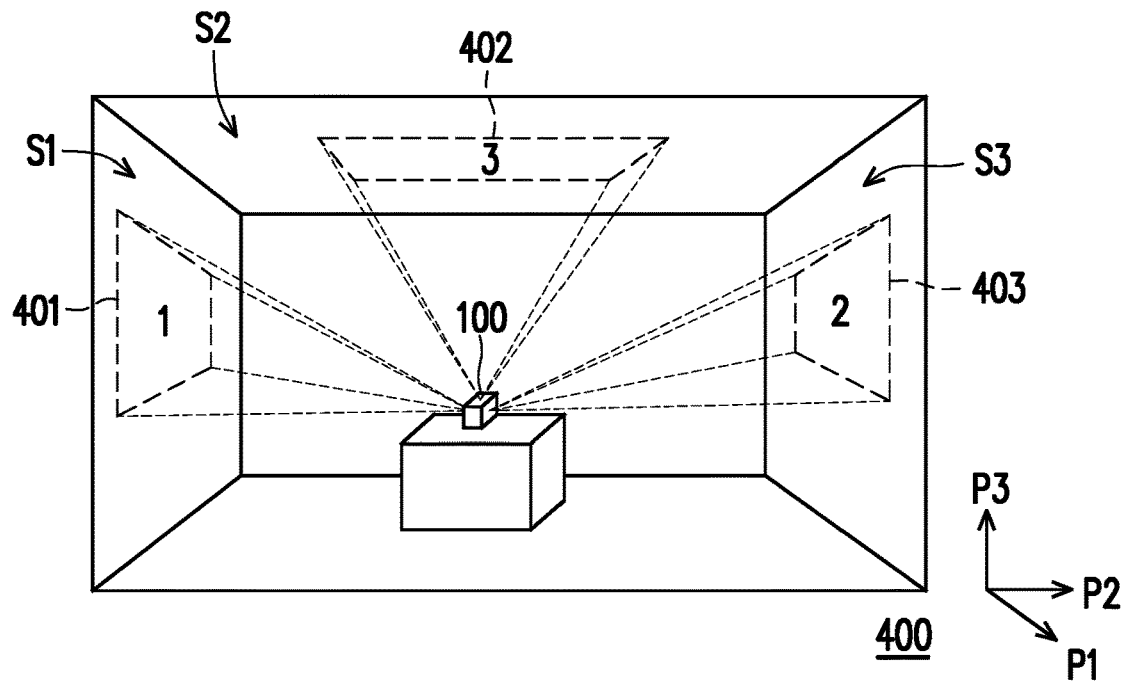
FIG. 4 is a situational schematic diagram of automatically determining an effective projection region according to an embodiment of the disclosure.

FIG. 4 is a situational schematic diagram of automatically determining an effective projection region according to an embodiment of the disclosure. Referring to FIG. 1 to FIG. 4, for example, the projection apparatus 100 of FIG. 1 may be located in a projection environment 400 of FIG. 4, and the method of FIG. 3 may be executed to determine the target projection region. As shown in FIG. 4, a plane formed by a direction P1 and a direction P2 is a horizontal plane of the projection environment 400, and a direction P3 is a vertical direction of the projection environment 400. The directions P1, P2, and P3 are perpendicular to each other to define a space of the projection environment 400. In detail, after the projection apparatus 100 is activated, the projection apparatus 100 executes the aforementioned step S310 to obtain an environmental image of the projection environment 400, such as a panoramic image (a 360-degree panoramic image). Then, the projection apparatus 100 executes the aforementioned step S320 to analyze the environmental image captured by the capturing image device 120. The projection apparatus 100 may, for example, provide three effective projection regions 401, 402, and 403 as shown in FIG. 4 for the user to select. The projection apparatus 100 may, for example, sequentially project prompt images one by one to the effective projection regions 401, 402, 403 (the so-called prompt images may be projection images with numbers, such as 1, 2, 3, etc., to express priorities of the best effective projection regions), so that the user may learn respective positions of one or more regions automatically determined to be suitable for image projection by the projection apparatus 100. The effective projection regions 401, 402, and 403 may be respectively located on projection surfaces S1, S2, S3 of different planes, but the disclosure is not limited thereto. In an embodiment, the effective projection regions 401, 402, and 403 may also be located on the same plane or on a non-planar plane.

Then, the projection apparatus 100 executes the aforementioned step S330 to select one of the effective projection regions 401, 402, 403 as the target projection region according to a control result of the user. It is assumed that the user selects the effective projection region 402 through the input device 150. Finally, the projection apparatus 100 executes the aforementioned step S340 to automatically project the projection image to the effective projection region 402 through the projection device 130. Therefore, the projection apparatus 100 of the embodiment may realize the function of automatically determining whether the current projection environment 400 has an effective projection region suitable for image projection.

Figure 5:
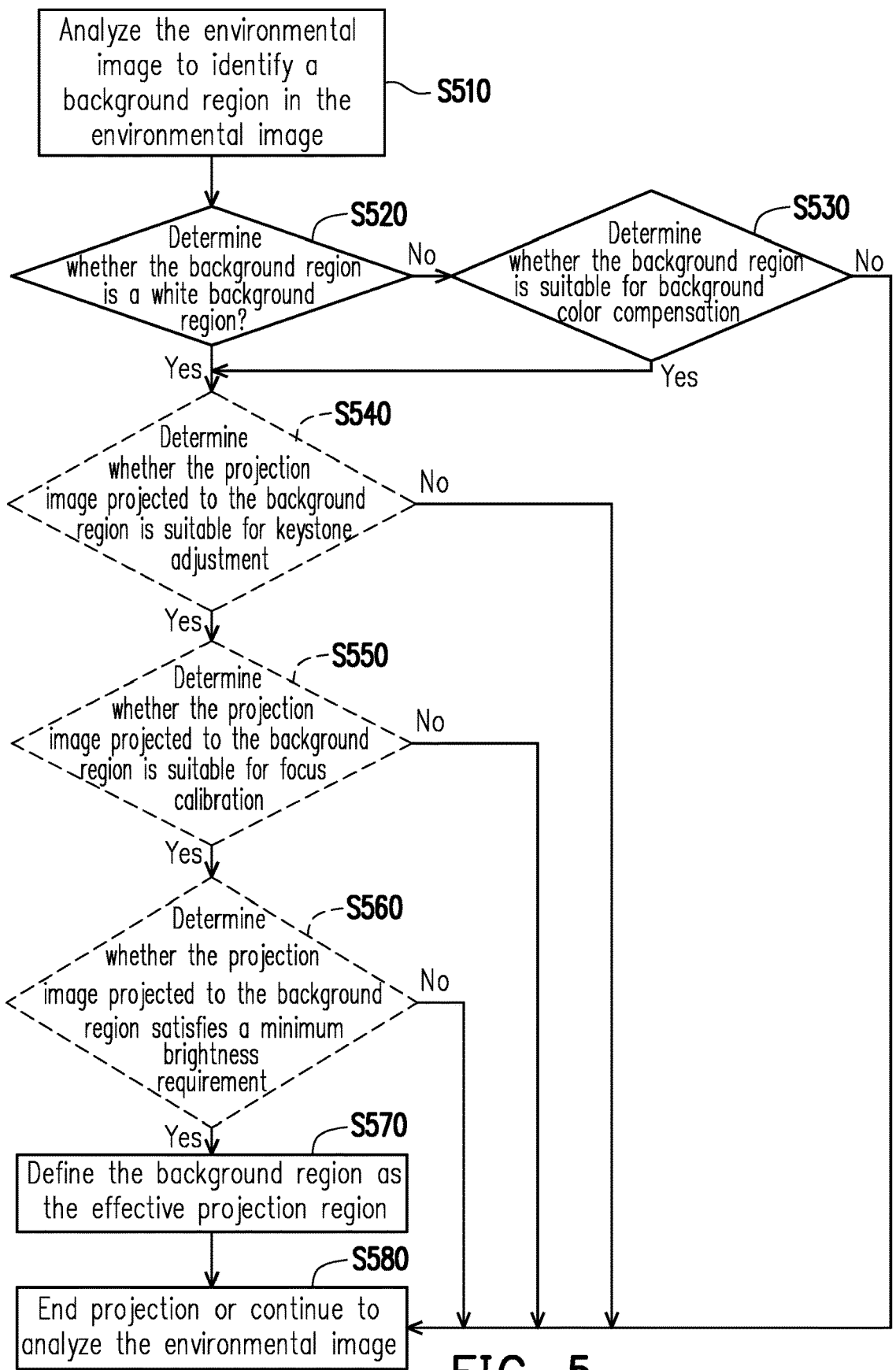
FIG. 5 is a flowchart of a flow of automatically determining an effective projection region according to an embodiment of the disclosure.

FIG. 5 is a flowchart of a flow of automatically determining an effective projection region according to an embodiment of the disclosure. Referring to FIG. 1, FIG. 4 and FIG. 5, the flow of automatically determining the effective projection region of FIG. 5 in the embodiment may be adapted to the projection apparatus 100 of FIG. 1, which will be described below with reference of the projection environment 400 of FIG. 4. It should be noted that the flow of the embodiment may be, for example, further implementation details of step S320 in the embodiment of FIG. 3 described above. In step S510, the processing device 110 of the projection apparatus 100 analyzes the environmental image of the projection environment 400 of FIG. 4 to identify a background region in the environmental image, such as the projection surface S1. In this regard, the projection apparatus 100 may, for example, determine a region with a large-area plane or with a curved surface having a fixed curvature in the environmental image, where the capturing image device 120 (such as a 360-degree camera or the aforementioned depth sensor) is used to perform image analysis, ranging or the above two image sensing units are used to perform three-dimensional sensing to obtain the effective projection region.

In step S520, the processing device 110 of the projection apparatus 100 identifies whether the background region (the projection surface S1) is a white background region. If not, the projection apparatus 100 executes step S530 to determine whether the background region is suitable for background color compensation. For example, the projection surface S1 presents a beige color (white biased to yellow). After the processing device 110 adjusts a hue of an image light beam projected by the projection device 130, through a background color compensation method, the projection image may visually display a color to be presented by an original image on the projection surface S1 without causing a problem of incorrect color. Namely, if the color of the projection surface S1 may be adjusted by the projection apparatus 100 through projection hue adjustment to implement background color compensation to achieve effective projection, the projection apparatus 100 executes step S540. Conversely, if the color of the projection surface S1 cannot achieve the effective projection after the background color compensation performed by the projection apparatus 100, the projection apparatus 100 executes step S580 to end projection or continue to analyze other positions of the environmental image. For example, the projection surface S1 presents a black color, and the processing device 110 of the projection apparatus 100 determines that the background region cannot implement background color compensation, so that the step S580 is executed to end the projection or continue to analyze other positions of the environmental image, i.e., to give up qualification of the projection surface serving as the effective projection region.

In step S540, it is assumed that the projection surface S1 has been determined to be a white background region or a background region capable of implementing background color compensation, the processing device 110 of the projection apparatus 100 determines whether the projection image projected to the background region is suitable for keystone adjustment. If not, the projection apparatus 100 executes step S580 to end projection or continue to analyze other positions of the environmental image. If yes, in step S550, the processing device 110 of the projection apparatus 100 determines whether the projection image projected to the background region is suitable for focus calibration. If not, the projection apparatus 100 executes step S580 to end projection or continue to analyze other positions of the environmental image. If yes, in step S560, the processing device 110 of the projection apparatus 100 determines whether the projection image projected to the background region satisfies a minimum brightness requirement. If yes, in step S570, the processing device 110 of the projection apparatus 100 defines the background region as the effective projection region. If not, the projection apparatus 100 executes step S580 to end projection or continue to analyze other positions of the environmental image.

The aforementioned effective projection region may be defined by the aforementioned parameters such as background region, keystone adjustment, focus calibration, brightness requirements, etc., but the disclosure is not limited thereto.

In other embodiments, whether a projection surface has an obvious concave-convex structure (such as a picture frame, a lamp, or a curtain), etc., may also be used as a parameter to determine whether the projection surface is an effective projection region.

In other words, through the determinations of the above steps S540-S560, if the projection image requires additional keystone adjustment, focus calibration, or brightness adjustment due to that the projection surface S1 is uneven, not continuous, or ambient light is too dark, the projection apparatus 100 may exclude the background region where the keystone adjustment or focal length correction cannot be performed, or even the ambient light is too dark to become an effective projection region through the determinations of steps S540-S560. Therefore, the flow of automatically determining the effective projection regions of the embodiment enables the projection apparatus 100 to effectively determine the effective projection regions 401, 402, and 403 in the projection environment 400 for the user to select. When at least one effective projection region is obtained, the storage device 160 of the projection apparatus 100 stores corresponding coordinates of the at least one effective projection region, and stores a coordinate position of the projection apparatus 100 relative to the at least one effective projection region in the projection environment. Thereafter, when the user uses the projection apparatus 100 in the same projection environment, the projection apparatus 100 does not need to use the capturing image device 120 to recapture/scan the environmental image, which may save a time for repeatedly scanning and analyzing the environmental image. The projection apparatus 100 may quickly and sequentially project the prompt images (projection images with numbers, such as 1, 2, 3, etc., to express priorities of the best effective projection regions) one by one to the effective projection regions 401, 402, 403 for the user to select.

Moreover, in an embodiment, after the user selects the target projection region in the effective projection regions, the projection apparatus 100 further performs automatic keystone adjustment, focus calibration, or brightness adjustment on the projection image subsequently projected to the target projection region. Moreover, in an embodiment, the above steps S540-S560 may also be selective steps, and the projection apparatus 100 may selectively not to perform steps S540-S560 or perform at least one of steps S540-S560 according to different projection requirements.

In another embodiment, after the user selects the target projection region in the effective projection regions, when the projection apparatus 100 performs the automatic keystone adjustment, focus calibration, or brightness adjustment on the projection image projected to the target projection region, based on the environmental image obtained by the capturing image device 120, the processing device 110 of the projection apparatus 100 determines a distance between the projection apparatus 100 and the target projection region and whether a configuration position of the projection apparatus 100 is an optimal position. If the configuration position is not the optimal position, the processing device 110 provides a prompt signal to the user, and the user may move the projection apparatus 100 to the optimal position. The prompt signal may be a sound prompt signal or a projected prompt image, etc., which is not limited by the disclosure.

Figure 6:
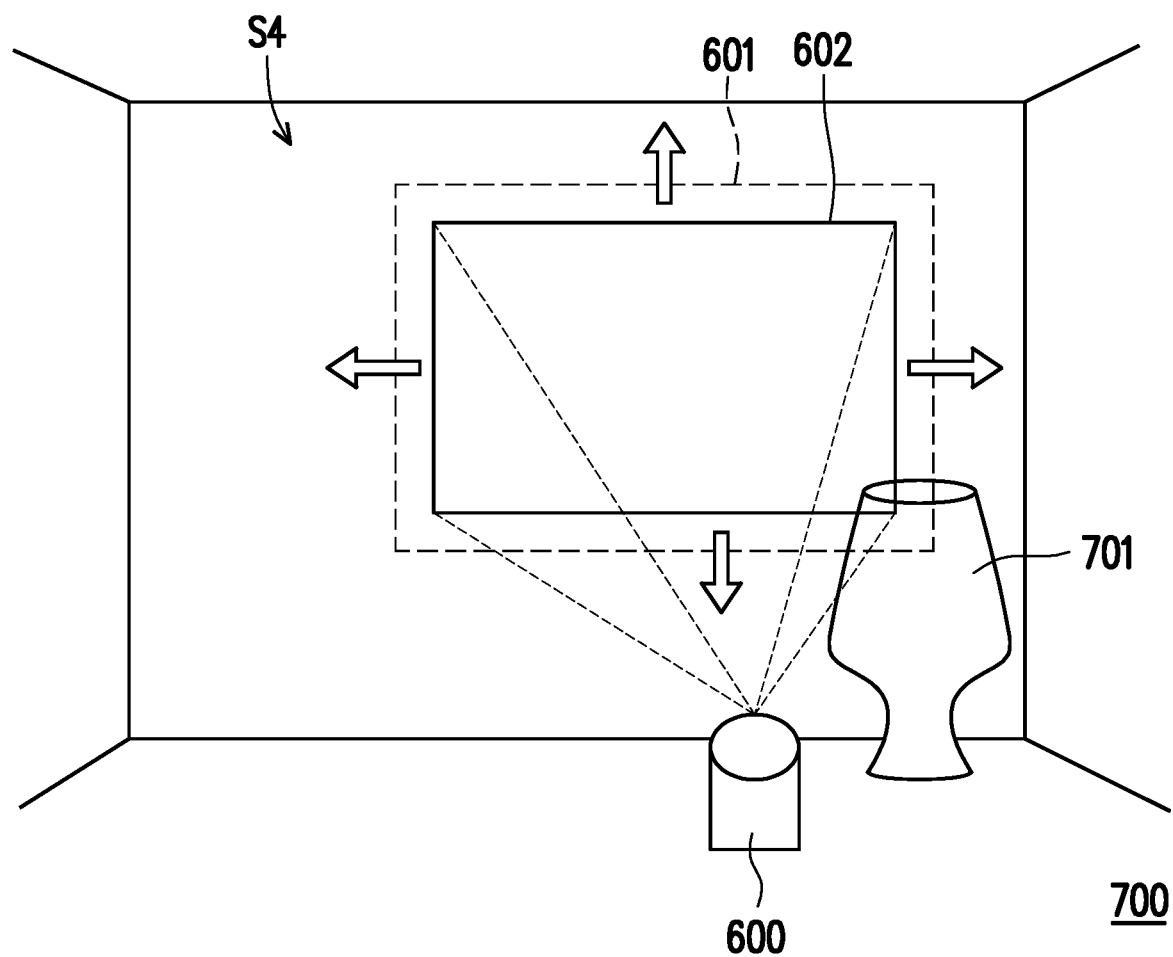
FIG. 6 is a situational schematic diagram of adjusting a target projection region according to an embodiment of the disclosure.

FIG. 6 is a situational schematic diagram of adjusting a target projection region according to an embodiment of the disclosure. Referring to FIG. 6, projection apparatus 600 of FIG. 6 may have device content and features similar as that of the projection apparatus 100 of the embodiment of FIG. 1, so that the descriptions of the embodiment of FIG. 1 may be referred, and details thereof are not repeated. As shown in FIG. 6, in a projection environment 700, when the projection apparatus 600 executes the flows shown in FIG. 3 and FIG. 5 and determines the effective projection region of the projection surface S4 to be a target projection region 601, the projection apparatus 600 may project a projection image 602 to the target projection region 601. However, as shown in FIG. 6, there may be an object 701 in the projection environment 700, and a part of the image light beam of the projection image 602 projected by the projection apparatus 600 is projected onto a surface of the object 701, which affects an overall projection effect.

In this regard, the projection apparatus 600 of the embodiment may have the following methods for adjusting a position of the projection image. For example, the projection apparatus 600 may determine a position of the object 701 through the capturing image device. The processing device automatically adjusts the position of the projection image 602 located in the target projection region 601 and projected by the projection device of the projection apparatus 600 according to the position of the object 701, so that the image light beam may avoid shading of the object 701. In other embodiments, the projection apparatus 600 may determine a face image of the user through the capturing image device, and adjust the position of the projection image 602 located in the target projection region 601 and projected by the projection device of the projection apparatus 600 according to a viewing direction of eyes corresponding to the face image of the user. For example, the projection apparatus 600 automatically determines a body position of the user and provides the most suitable target projection region. For example, when the capturing image device of the projection apparatus 600 senses that the user is currently lying on a bed, the projection apparatus 600 automatically projects the projection image to a ceiling according to a direction of a line of sight of the user, and if it is detected that the user has sat up and there is an effective projection region in the direction of the line of sight, the projection is automatically switched to the effective projection region, or the projection apparatus 600 sends a prompt signal for the user to choose whether to change a projection direction.

For another example, the projection apparatus 600 may determine a gesture image of the user through the capturing image device, and adjust the position of the projection image 602 located in the target projection region 601 and projected by the projection device of the projection apparatus 600 according to gesture information corresponding to the gesture image of the user. For another example, the processing device of the projection apparatus 600 may obtain another control signal (a voice signal or a control signal output by the remote control device) through the input device, and adjust the position of the projection image 602 located in the target projection region 601 and projected by the projection device of the projection apparatus 600 according to the other control signal.

In another example, through the environmental image captured by the capturing image device, the processing device of the projection apparatus 600 may automatically adjust the position of the projection image 602 located in the target projection region 601 and projected by the projection device of the projection apparatus 600. In another embodiment, the projection apparatus 600 also projects an adjustment prompt pattern (such as an arrow pattern) to the projection surface S4 or to a position near the projection image 602 in the target projection region 601 through the projection device, so as to prompt the user to operate and move the projection apparatus 600 or operate a projection direction of the projection apparatus 600. For another example, the remote control device of the input device of the projection apparatus 600 may have a nine-axis sensor, so that when the user rotates or moves the remote control device, the projection device of the projection apparatus 600 may correspondingly change a projection angle.

In addition, in another projection situation, the projection apparatus 600 may also be operated in a standby mode, and when the projection apparatus 600 senses appearance of a human image through the capturing image device, the processing device of the projection apparatus 600 wakes up the other devices of the projection apparatus, and the projection device of the projection apparatus 600 projects another projection image to the target projection region 601 to realize diversified automatic projection functions. For example, when the user returns home, the projection apparatus 600 automatically determines an identity of the user through the capturing image device, and projects a welcome image to the target projection region. In addition, the projection apparatus 600 may project images of different contents and colors according to different times, seasons, or festivals. The aforementioned images may all be stored in the storage device 160. In other embodiments, when the projection apparatus 600 senses that no one is appeared through the capturing image device, the processing device of the projection apparatus 600 wakes up a disinfection device to automatically spray disinfectant at 360 degrees through the multi-axis motor device 140 to perform environmental sterilization or disinfection. The projection apparatus 600 may further automatically store a spray range to continue spraying a last unfinished spray range and gradually complete the disinfection of the entire environment. When the capturing image device senses that a user is nearby, the processing device of the projection apparatus 600 controls the disinfection device to stop disinfecting. In other embodiments, the projection apparatus 600 may perform disinfection within a setting time, or the projection apparatus 600 may perform the disinfection through voice or remote control.

In summary, the projection apparatus and the projection method of the disclosure have the function of automatically determining the effective projection regions in the projection environment at 360 degrees, so that the user only needs to activate the projection apparatus to select the effective projection regions in the 360 degrees projection environment determined by the projection apparatus as the target projection region, so as to realize an efficient projection operation. In addition, the projection apparatus and the projection method of the disclosure may further perform convenient adjustment on the projection position of the projection image projected in the target projection region. Accordingly, the projection apparatus and the projection method of the disclosure may provide a good user experience.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents. Moreover, any embodiment of or the claims of the disclosure is unnecessary to implement all advantages or features disclosed by the disclosure. Moreover, the abstract and the name of the disclosure are only used to assist patent searching. Moreover, "first", "second", etc. mentioned in the specification and the claims are merely used to name the elements and should not be regarded as limiting the upper or lower bound of the number of the components/devices.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A projection apparatus, comprising a projection device, a capturing image device, and a processing device, wherein:
   the capturing image device is configured to obtain an environmental image; and
   the processing device is coupled to the projection device and the capturing image device, and is configured to analyze the environmental image to provide at least one effective projection region, wherein
   the processing device is configured to select one of the at least one effective projection regions as a target projection region, and the processing device is configured to determine whether a distance between the projection apparatus and the target projection region matches a predetermined distance, and the projection device is configured to project a projection image to the target projection region when the distance matches the predetermined distance, and the processing device is configured to provide a prompt signal for informing to move the projection device when the distance does not match the predetermined distance.

2. The projection apparatus as claimed in claim 1, wherein the processing device analyzes the environmental image to identify at least one background region of the environmental image, and the processing device defines the at least one background region as the at least one effective projection region.

3. The projection apparatus as claimed in claim 2, wherein the processing device further determines whether the projection image is suitable for keystone adjustment through the capturing image device when the projection device projects the projection image to the at least one background region, so as to determine whether to define the at least one background region as the at least one effective projection region.

4. The projection apparatus as claimed in claim 2, wherein the processing device further determines whether the projection image is suitable for focus calibration through the capturing image device when the projection device projects the projection image to the at least one background region, so as to determine whether to define the at least one background region as the at least one effective projection region.

5. The projection apparatus as claimed in claim 2, wherein the processing device further determines whether the projection image satisfies a minimum brightness requirement through the capturing image device when the projection device projects the projection image to the at least one background region, so as to determine whether to define the at least one background region as the at least one effective projection region.

6. The projection apparatus as claimed in claim 2, wherein the processing device further determines whether the projection image is suitable for background color compensation through the capturing image device when the projection device projects the projection image to the at least one background region, so as to determine whether to define the at least one background region as the at least one effective projection region.

7. The projection apparatus as claimed in claim 1, further comprising an input device coupled to the processing device, and configured to output a control signal to the processing device to select one of the at least one effective projection regions as the target projection region.

8. The projection apparatus as claimed in claim 7, wherein the projection device sequentially projects at least one prompt image to the at least one effective projection region in advance, and when the input device outputs the control signal to the processing device to select one of the at least one effective projection regions as the target projection region, the projection device projects the projection image to the target projection region.

9. The projection apparatus as claimed in claim 7, wherein the input device comprises a sound sensing device configured to sense a voice signal to correspondingly output the control signal.

10. The projection apparatus as claimed in claim 7, wherein the input device comprises a remote control device configured to correspondingly output the control signal according to an operation result.

11. The projection apparatus as claimed in claim 1, wherein the processing device determines a face image through the capturing image device, and adjusts a position of the projection image located in the target projection region and projected by the projection device according to a viewing direction corresponding to the face image.

12. The projection apparatus as claimed in claim 1, wherein the processing device determines a gesture image through the capturing image device, and adjusts a position of the projection image located in the target projection region and projected by the projection device according to gesture information corresponding to the gesture image.

13. The projection apparatus as claimed in claim 1, wherein the processing device further projects an adjustment prompt pattern through the projection device to the projection image projected to the target projection region by the projection device.

14. The projection apparatus as claimed in claim 1, wherein the capturing image device is a camera, and the environmental image is a panoramic image.

15. The projection apparatus as claimed in claim 1, wherein the capturing image device comprises a depth sensor, and the depth sensor is a time-of-flight sensor.

16. The projection apparatus as claimed in claim 1, wherein the capturing image device comprises two image sensing units, and the two image sensing units are configured to perform three-dimensional sensing.

17. The projection apparatus as claimed in claim 1, further comprising:
a multi-axis motor device, coupled to the processing device, and configured to carry the projection device,
wherein the processing device controls the multi-axis motor device so that the projection device projects the projection image toward the target projection region.

18. A projection method, comprising:
obtaining an environmental image by a capturing image device;
analyzing the environmental image by a processing device to provide at least one effective projection region, wherein
one of the at least one effective projection regions is selected as a target projection region by the processing device;
determining whether a distance between the projection apparatus and the target projection region matches a predetermined distance;
projecting a projection image to the target projection region by a projection device when the distance matches the predetermined distance; and
providing a prompt signal for informing to move the projection device when the distance does not match the predetermined distance.

19. The projection method as claimed in claim 18, wherein the step of analyzing the environmental image by the processing device to provide the at least one effective projection region comprises:
analyzing the environmental image by the processing device to identify at least one background region of the environmental image; and
defining the at least one background region as the at least one effective projection region by the processing device.

20. The projection method as claimed in claim 19, wherein the step of defining the at least one background region as the at least one effective projection region by the processing device comprises:

determining whether the projection image is suitable for keystone adjustment by the capturing image device when the projection device projects the projection image to the at least one background region, so as to determine whether to define the at least one background region as the at least one effective projection region by the processing device.

21. The projection method as claimed in claim 19, wherein the step of defining the at least one background region as the at least one effective projection region by the processing device comprises:

determining whether the projection image is suitable for focus calibration by the capturing image device when the projection device projects the projection image to the at least one background region, so as to determine whether to define the at least one background region as the at least one effective projection region by the processing device.

22. The projection method as claimed in claim 19, wherein the step of defining the at least one background region as the at least one effective projection region by the processing device comprises:

determining whether the projection image satisfies a minimum brightness requirement by the capturing image device when the projection device projects the projection image to the at least one background region, so as to determine whether to define the at least one background region as the at least one effective projection region by the processing device.

23. The projection method as claimed in claim 19, wherein the step of defining the at least one background region as the at least one effective projection region by the processing device comprises:

determining whether the projection image is suitable for background color compensation by the capturing image device when the projection device projects the projection image to the at least one background region, so as to determine whether to define the at least one background region as the at least one effective projection region by the processing device.

24. The projection method as claimed in claim 18, further comprising: outputting a control signal to the processing device by an input device to select one of the at least one effective projection regions as the target projection region.

25. The projection method as claimed in claim 24, wherein the projection device sequentially projects at least one prompt image to the at least one effective projection region in advance, and when the input device outputs the control signal to the processing device to select one of the at least one effective projection regions as the target projection region, the projection device projects the projection image to the target projection region.

26. The projection method as claimed in claim 24, wherein the input device comprises a sound sensing device configured to sense a voice signal to correspondingly output the control signal.

27. The projection method as claimed in claim 24, wherein the input device comprises a remote control device configured to correspondingly output the control signal according to an operation result.

28. The projection method as claimed in claim 18, further comprising:

determining a face image by the capturing image device; and adjusting a position of the projection image located in the target projection region and projected by the projection device by the processing device according to a viewing direction corresponding to the face image.

29. The projection method as claimed in claim 18, further comprising:

determining a gesture image by the capturing image device; and adjusting a position of the projection image located in the target projection region and projected by the projection device by the processing device according to gesture information corresponding to the gesture image.

30. The projection method as claimed in claim 18, further comprising:

projecting an adjustment prompt pattern by the projection device to the projection image projected to the target projection region by the projection device.

31. The projection method as claimed in claim 18, wherein the capturing image device is a camera, and the environmental image is a panoramic image.

32. The projection method as claimed in claim 18, wherein the capturing image device comprises a depth sensor, and the depth sensor is a time-of-flight sensor.

33. The projection method as claimed in claim 18, wherein the capturing image device comprises two image sensing units, and the two image sensing units are configured to perform three-dimensional sensing.

34. The projection method as claimed in claim 18, wherein the step of projecting the projection image to the selected effective projection region by the projection device comprises:

controlling a multi-axis motor device carrying the projection device by the processing device, so that the projection device projects the projection image toward the target projection region.

* * * * *